June 22, 1926.

E. E. JONES

SAW GUARD

Filed Jan. 7, 1925

Witnesses:

Inventor
Emerald E. Jones
By Joshua R. H. Roth
His Attorney

June 22, 1926.
E. E. JONES
SAW GUARD
Filed Jan. 7, 1925
1,589,970
3 Sheets-Sheet 3
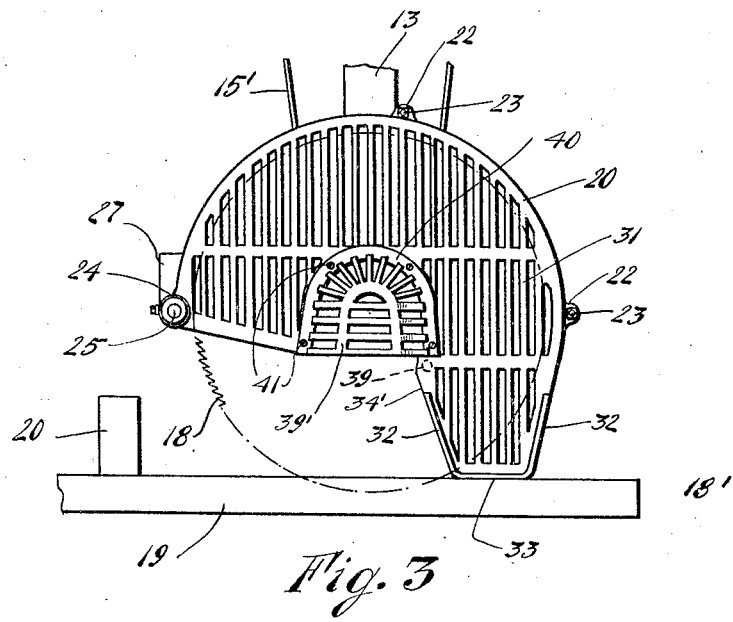
Fig. 3
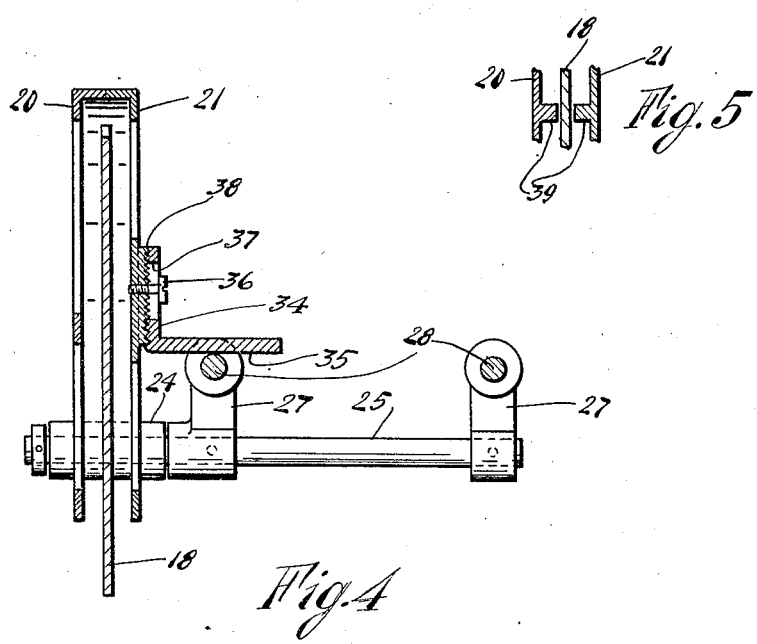
Fig. 4
Fig. 5
Witnesses:
Inventor:
Emerald E. Jones
By Joshua R. H. Potts
His Attorney.

Patented June 22, 1926.

1,589,970

UNITED STATES PATENT OFFICE.

EMERALD E. JONES, OF CHICAGO, ILLINOIS.

SAW GUARD.

Application filed January 7, 1925. Serial No. 1,000.

This invention relates to certain novel improvements in saw guards and has for its principal object the provision of an improved construction of this character which will be highly efficient in use and economical in manufacture.

Among the salient objects of the invention is the provision of a device of this character provided with guard elements or plates supported for pivotal movement with the elements enclosing dangerous exposed parts of a saw. The construction of the device in its preferred form of construction is such that the guard elements will automatically raise and lower when the saw blade is moved into operative and inoperative positions. The guard is further constructed so as not to interfere with the work placed on the table to be operated on by the saw and it is the object of the invention to construct the device of such metal that will be light in weight yet durable and it is intended that the guard elements or parts be pivoted in such manner that they can be instantly raised for the purpose of changing the saw and instantly returned to position without being removed from their supporting elements.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of the invention;

Fig. 3 is an elevational view of the opposite side of the invention as shown in Fig. 1;

Fig. 4 is a sectional view taken substantially on line 4—4 of Fig. 1; and,

Fig. 5 is a fragmentary sectional view taken substantially on line 5—5 of Fig. 1.

Figure 1:
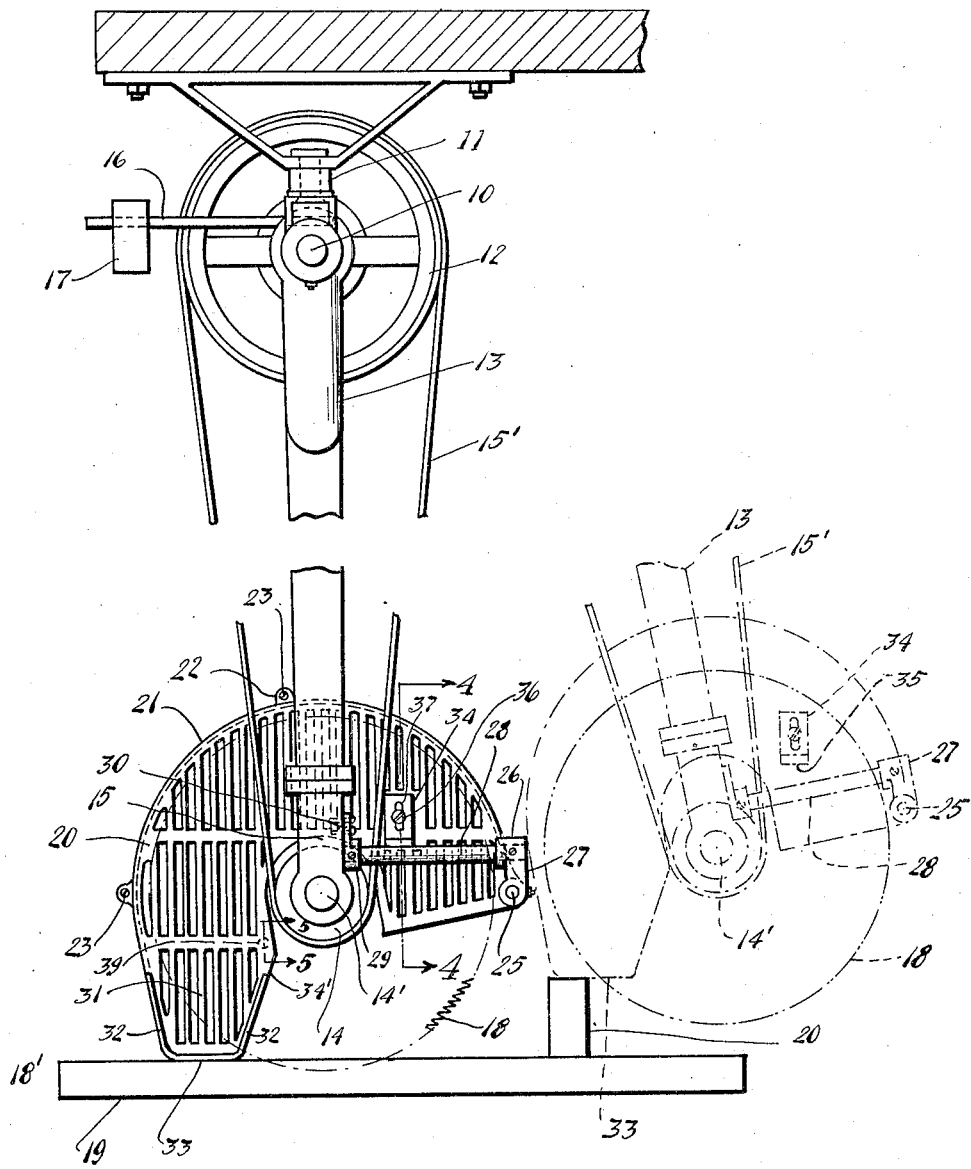

The device as illustrated in the drawings, in its preferred form of construction, is especially designed and constructed to be used in connection with the swing saw type including an overhead shaft 10 supported by suitable bearings 11 and carrying a drive pulley 12 and a swing arm 13, the drive pulley 12 being operatively connected to a pulley 14 on a shaft 14', at the lower end of the swing arm, by a bearing 15 of the yoke type by means of a belt 15' and the arm is preferably counter balanced in a perpendicular position by means of an arm 16 carrying a weight 17. The shaft 14' carries a circular saw 18 of a well-known type. In operating the saw the operator stands to the front 18' of a table or platform 19 across which the saw works, and the table or platform 19 is provided with, what is well known in this art as a fence 20, or in other words, a stop or gauge against which work to be operated on is placed. To operate the saw, a suitable handle, not shown, is provided in a convenient place for swinging the saw transversely across the table or platform 19 into contact with the work.

Without the employment of a guard for this type of saw, the operator is in danger of injuring himself due to the swinging motion of the saw or due to miscalculations of placing the work upon the table when the saw is in motion and it is my object to provide a safety guard which will entirely eliminate all possibilities of injury by reason of the fact that the safety device will practically enclose all dangerous points and parts of the saw.

Figure 2:
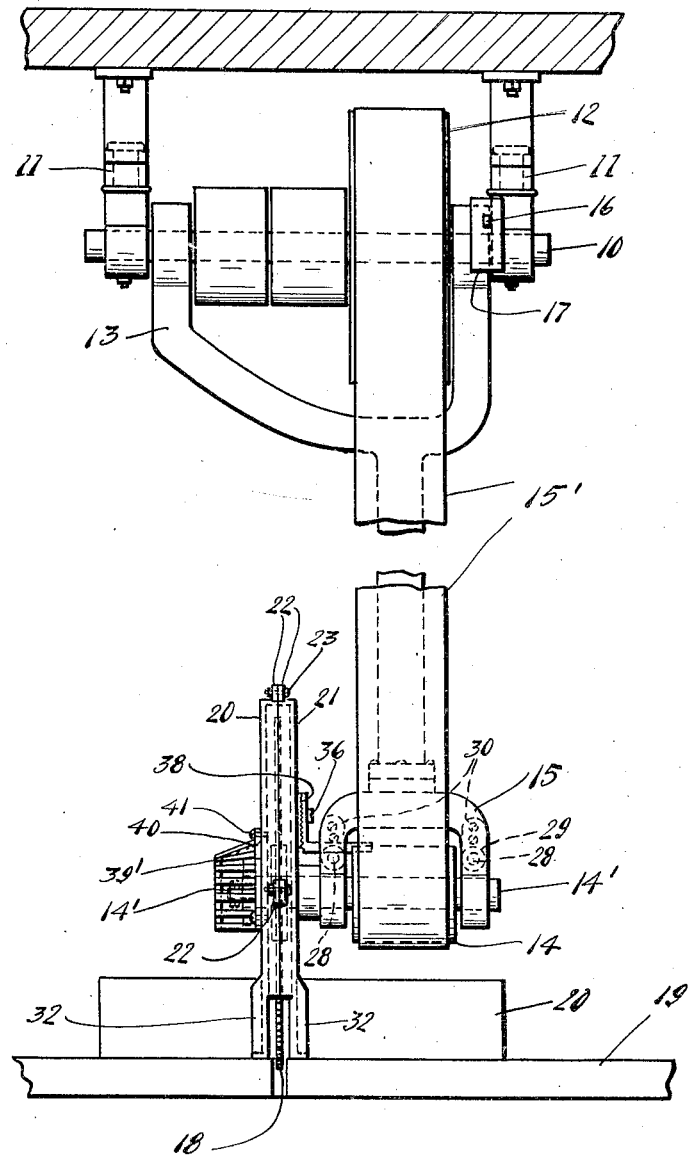
Fig. 2 is a front elevational view of the same.

The safety guard herein referred to includes oppositely disposed guard elements or plates 20 and 21 provided with extensions or ears 22 affording means of fixing the plates together by means of bolts 23 with the plates disposed on opposite sides of the saw blade 18, said plates being provided with a plurality of slots through which the saw element and the work may be viewed as the saw is in operation. The guard elements in the present instance I prefer to provide with bosses 24 through which a pintle 25 is taken, the pintle in the present instance being fixed to brackets 26 having depending portions 27 permitting the longitudinal center line of the pintle to be in the same horizontal plane as the longitudinal center line of the shaft 14', and the pintle in the present instance extends substantially at right angles with the depending portions and to the rear of the shaft 14'. The brackets are supported by arms 28 extending parallel in spaced relation with respect to the adjacent guard elements or plates and laterally from the swing arm 13 and fixed to supporting brackets 29 having portions 30 fixed to the bearing 15 which is of the yoke shaped type as shown in Fig. 2. By this arrangement the guards when fixed together to enclose the saw blade 18 are permitted to freely pivot about the pintle 25.

As best shown in Fig. 1 the guard elements or plates are provided with integral extended portions 31 having their peripheral edges reinforced by lateral ribs 32. These extended portions extend below the horizontal axis of the shaft 14' and the bottoms 33 of such extensions are adapted to slidably engage the top of the table or platform 19. As shown the inner side edges of these extended portions as indicated at 34' are inclined downwardly and forwardly and are adapted when the swing arm is swung to the rear of the table to engage the fence 20 and upon such engagement the guard is automatically raised in the position illustrated in dotted lines in Fig. 1. This mounting of the guard plates permits the operator to place the work to be operated upon the table 19 without fear that the swing saw might accidentally move to the front of the table and thereby do him bodily injury. It will be seen that the inclination of the side edges of the extended portions, will automatically raise and lower the guards over and above the work by reason of the engagement with the fence as the saw is swung into operative position and out of operative position to operate on the work.

While I have in the preferred form of construction constructed the supporting elements of the saw guard so that they will support the saw guard for pivotal movement as above outlined it is necessary to provide means which will serve as a stop to prevent the guard from coming into contact with the cutting edges of the saw and to prevent this I prefer to provide a stop 34 which is in the form of an angle having a horizontal projecting portion 35 extending over and on top of the adjacent arm 28. The stop is attached to the adjacent guard by means of a bolt 36 taken through an elongated slot 37 which permits vertical adjustment of the stop, the adjacent side surfaces of the stop and of the guard plate being roughened as indicated at 38 to facilitate adjusting the stop in the proper position.

I have also provided in the preferred form of construction means which will prevent the sides of the guard plates from coming into contact with the adjacent sides of the saw due to vibration of the saw and this means in the present instance, includes laterally projecting elements 39 disposed on opposite sides of the saw and forming an integral part of the guard plates, the extremities of these elements being arranged in close proximity with the saw preventing the saw from coming into contact with the guard plates which would be detrimental to the saw and other parts of the device.

As best shown in Fig. 2 the end of the shaft 14' extends beyond the adjacent guard plate and to protect the operator of the saw against injury from this shaft extended portion I propose to provide as a part of the invention a suitable hood enclosing this part. As shown in Figs. 2 and 3 the hood is indicated at 39' and is provided with a flange 40 affording means of attachment to the adjacent guard plates through the medium of bolts 41.

It is apparent from the description herein and the disclosure of the drawings that I provide a safety guard for saws not only for saws of the swinging type but for saws which are exposed above the table on which the work to be operated on is placed and it is further apparent that the structure is simple and can be assembled by others than a mechanic.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A saw guard including guard elements adapted to be secured together and disposed on opposite sides of a saw, supporting brackets having laterally extending arms, supporting brackets carried by the arms and having depending portions pivotally carrying the guards to permit the guards to be raised or lowered to enclose the saw, a hood carried by one of the guard plates enclosing an end of a shaft carrying the saw, and a member adjustably carried by one of the guard plates and having a horizontal projection for engagement with one of the arms adapted to limit the movement of the guard plates into lowered position.

2. A saw guard including guard elements adapted to be secured together and disposed on opposite sides of a saw, supporting brackets having laterally extending arms, supporting brackets carried by the arms and having depending portions pivotally carrying the guards to permit the guards to be raised or lowered to enclose the saw, a hood carried by one of the guard plates enclosing an end of a shaft carrying the saw, a member adjustably carried by one of the guard plates and having a horizontal projection for engagement with one of the arms adapted to limit the movement of the guard plates into lowered position, and projections on the guard plates having their extremities in close proximity with the saw preventing contact of the saw with the adjacent sides of the plates.

3. A device of the class described, in combination with a swinging arm carrying a shaft at its lower end with a saw thereon, brackets on said arm at the lower end thereof and having laterally projecting arms, brackets at the ends of the arms and provided with depending portions, guard plates disposed on opposite sides of the saw and pivotally carried by the depending portions, the longitudinal center of the pivot connection between said guard plates and said depending portions being to the rear of the arm and in a horizontal plane with the longitudinal center of the shaft carrying the saw, and adjustable means on a guard plate adapted for engagement with one of the arms to limit movement of the guard plates to a position enclosing the saw.

4. A device of the class described, in combination with a swinging arm carrying a shaft at its lower end with a saw thereon, brackets on said arm at the lower end thereof and having laterally projecting arms, brackets at the ends of the arms and provided with depending portions, guard plates disposed on opposite sides of the saw and pivotally carried by the depending portions, the longitudinal center of the pivot connection between said guard plates and said depending portions being to the rear of the arm and in a horizontal plane with the longitudinal center of the shaft carrying the saw, means adapted for engagement with one of the arms to limit movement of the guard plates to a position enclosing the saw, and a hood carried by the guard plates enclosing an end portion of the shaft carrying the saw.

5. A device of the class described, in combination with a swinging arm carrying a shaft at its lower end with a saw thereon, brackets on said arm at the lower end thereof and having laterally projecting arms, brackets at the ends of the arms and provided with depending portions, guard plates disposed on opposite sides of the saw and pivotally carried by the depending portions, the longitudinal center of the pivot connection between said guard plates and said depending portions being to the rear of the arm and in a horizontal plane with the longitudinal center of the shaft carrying the saw, and a hood carried by the guard plates enclosing an end portion of the shaft carrying the saw.

In testimony whereof I have signed my name to this specification.

EMERALD E. JONES.